(12) United States Patent
Matsuo et al.

(10) Patent No.: US 12,182,946 B2
(45) Date of Patent: Dec. 31, 2024

(54) MIXED REALITY SPACE SHARING SYSTEM, SHARING INFORMATION MANAGEMENT SERVER, MIXED REALITY TERMINAL, MIXED REALITY SPACE SHARING METHOD, AND SHARING INFORMATION MANAGEMENT PROGRAM

(71) Applicant: NIPPON TELEGRAPH AND TELEPHONE CORPORATION, Tokyo (JP)

(72) Inventors: Kazuya Matsuo, Musashino (JP); Masaru Takagi, Musashino (JP); Ryota Nakada, Musashino (JP); Koya Mori, Musashino (JP); Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/631,402

(22) PCT Filed: Jul. 31, 2019

(86) PCT No.: PCT/JP2019/030002
§ 371 (c)(1),
(2) Date: Jan. 28, 2022

(87) PCT Pub. No.: WO2021/019723
PCT Pub. Date: Feb. 4, 2021

(65) Prior Publication Data
US 2022/0335693 A1    Oct. 20, 2022

(51) Int. Cl.
*G06T 19/00* (2011.01)
(52) U.S. Cl.
CPC .................. *G06T 19/006* (2013.01)

(58) Field of Classification Search
CPC ....... G06T 19/006; G06T 19/00; G06T 19/20; G06T 2200/04; G06T 2200/08;
(Continued)

(56) References Cited

U.S. PATENT DOCUMENTS 10,586,302 B1 *   3/2020   Brooks ..................... G06T 1/20
11,727,643 B1 *   8/2023   Bhushan ................. H04L 65/80
                                                               345/420

(Continued)

FOREIGN PATENT DOCUMENTS

JP          2002157607 A       5/2002

OTHER PUBLICATIONS

Microsoft Corporation, "Mixed Reality technology to support Microsoft HoloLens business", Microsoft HoloLens, Jun. 24, 2019 (Reading Day), https://www.microsoft.com/ja-jp/HoloLens.

(Continued)

*Primary Examiner* — Chante E Harrison
(74) *Attorney, Agent, or Firm* — Harness, Dickey & Pierce, P.L.C.

(57) ABSTRACT

A mixed reality space sharing system is provided with which 3D information regarding a target real space can be shared between a plurality of MR terminals while keeping the information updated, without spending a long processing time. A shared information management server includes an information management unit for creating a room by associating, with each other, 3D information and anchor information that are transmitted from a first terminal, which is at least one of a plurality of mixed reality terminals, and managing the 3D information, and a sharing unit for transmitting the 3D information and the anchor information to a second terminal different from the first terminal. The second terminal downloads the 3D information and the anchor information transmitted from the shared information man- (Continued)

agement server and creates a mixed reality space using the downloaded information.

6 Claims, 11 Drawing Sheets

(58) Field of Classification Search
CPC ...... G06T 15/20; H04L 12/1813; H04W 4/38; G06F 3/011; G06F 3/1454
See application file for complete search history.

(56) References Cited

U.S. PATENT DOCUMENTS

| | | | |
|---|---|---|---|
| 2002/0075286 A1 | 6/2002 | Yonezawa et al. | |
| 2010/0026714 A1* | 2/2010 | Utagawa | G02B 27/017 345/633 |
| 2016/0239978 A1* | 8/2016 | Cole | G06T 7/557 |
| 2016/0253839 A1* | 9/2016 | Cole | H04N 13/189 345/420 |
| 2017/0178408 A1* | 6/2017 | Bavor, Jr. | G06T 19/006 |
| 2019/0310761 A1* | 10/2019 | Agarawala | G06F 3/04817 |
| 2019/0313059 A1* | 10/2019 | Agarawala | G06T 19/006 |
| 2020/0090407 A1* | 3/2020 | Miranda | G06T 17/05 |
| 2022/0129066 A1* | 4/2022 | Zahnert | G02B 27/0179 |
| 2022/0383396 A1* | 12/2022 | Haapoja | G06Q 30/0643 |

OTHER PUBLICATIONS

Tarik Taleb et al., "PERMIT: Network slicing for personalized 5G mobile telecommunications", IEEE Communications Magazine, vol. 55, No. 5, 2017, pp. 88-93.
Federico Debandi et al., "Enhancing cultural tourism by a mixed reality application for outdoor navigation and information browsing using immersive devices", IOP Conference Series: Materials Science and Engineering, vol. 364, 2018.
Dina Bass and Mark Gurman, "How Microsoft Jumped on Apple's Laptop Stumbles, Bloomberg", May 3, 2017, https://www.bloomberg.com/news/features/2017-05-03/microsoft-gets-hardware-religion.
Microsoft Corporation, "Layout | Microsoft Dynamics 365, more efficient space design", Microsoft Dynamics 365, Jun. 24, 2019 (Reading Day), https://dynamics.microsoft.com/ja-jp/mixed-reality/layout/.
Microsoft Corporation, "Remote Assis Microsoft Dynamics 365, collaborate from anywhere", Microsoft Dynamics 365, Jun. 24, 2019 (Reading Day), https://dynamics.microsoft.com/ja-jp/mixed-reality/remote-assist/.
Nextscape Inc., "Japan's first! Microsoft Holorens adopted for condominium sales", literature, May 23, 2017, https://www.nextscape.net/news/2017/05/20170523.
"Join GitHub today microsoft/MixedReality Toolkit", Jun. 24, 2019 (Reading Day), https://github.com/Microsoft/MixedRealityToolkit/tree/c562ff9582cd10ea0448fd846f7b2bb261e8f551.

* cited by examiner

Fig. 8
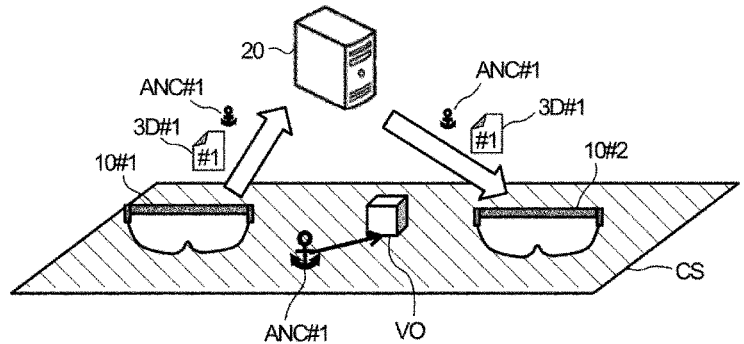
Fig. 9
| ROOM | MR TERMINAL | ANCHOR | 3D INFORMATION |
|---|---|---|---|
| RM#1 | TA#1, TA#2 | ANC#1 | 3D#1 |
Fig. 10
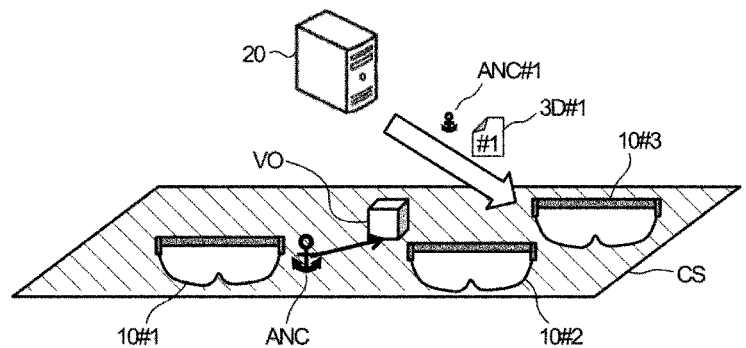

Fig. 11
| ROOM | MR TERMINAL | ANCHOR | 3D INFORMATION |
|------|-------------|--------|----------------|
| RM#1 | TA#1, TA#2, TA#3 | ANC#1 | 3D#1 |
Fig. 12
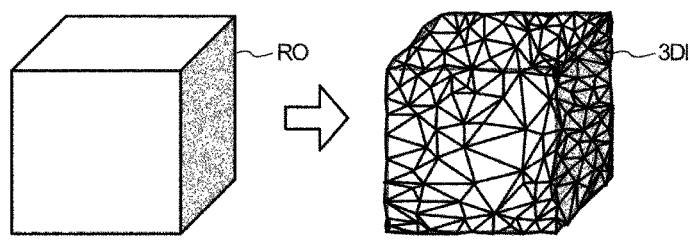
Fig. 13
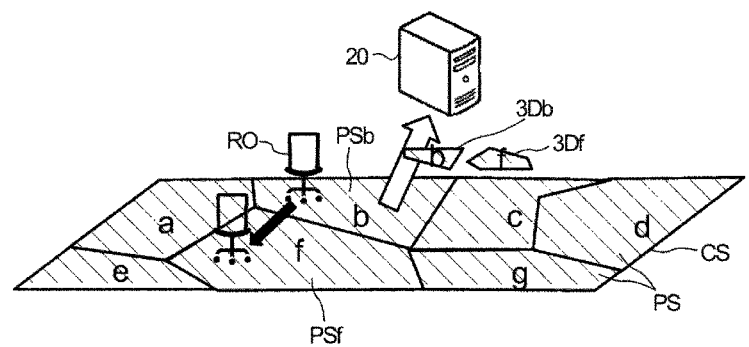

MIXED REALITY SPACE SHARING SYSTEM, SHARING INFORMATION MANAGEMENT SERVER, MIXED REALITY TERMINAL, MIXED REALITY SPACE SHARING METHOD, AND SHARING INFORMATION MANAGEMENT PROGRAM

CROSS-REFERENCE TO RELATED APPLICATIONS

This application is a 371 U.S. National Phase of International Application No. PCT/JP2019/030002 filed on Jul. 31, 2019. The entire disclosure of the above application is incorporated herein by reference.

TECHNICAL FIELD

An aspect of this invention relates to a mixed reality space sharing system, a shared information management server, a mixed reality terminal, a mixed reality space sharing method, and a shared information management program.

BACKGROUND ART

In recent years, with the evolution of augmented reality (AR) and virtual reality (VR), mixed reality (MR), which integrates them, has been attracting attention. MR refers to a technology that constructs a space (mixed reality space) where a virtual space and a real space are mixed by projecting virtual information onto the real space. The market size of MR is increasing year by year. A typical device for realizing MR is Microsoft's HoloLens (e.g., see NPL 1). HoloLens is equipped with a sensor for acquiring a real space as three-dimensional (3D) information. HoloLens mixes a virtual space with the real space by mapping virtual information onto a 3D model of the real space acquired by this sensor. HoloLens allows users to experience a mixed reality space by projecting the thus-constructed mixed reality space onto a transmission holographic lens. MR terminals typified by HoloLens are also gaining attention as next-generation mobile terminals to replace smartphones (e.g., see NPLs 2, 3, and 4). It is considered that, in the future, MR terminals will be used not only in the above examples, but also in more general manners and in various places, both indoors and outdoors.

Examples of MR applications include those that can be completed by an individual, such as "projecting a 3D model in a chamber and simulating layouts (e.g., see NPL 5). Other examples include "in the construction and manufacturing industries, presenting instructions from an operator as virtual information in a site worker's field of view (e.g., see NPL 6)" and "in the real estate industry, presenting the figure of a finished building in a planned building construction site as a 3D object in a customer's field of view (e.g., see NPL 7). Thus, MR is currently attracting attention as a technology for sharing virtual information in a real space for collaborative work and decision making between a plurality of people.

Against this background, Microsoft is advocating "collaborative computing". Collaborative computing is a computing model in which information that is currently viewed by each individual via a PC is projected into a real space and shared by a plurality of people, who interact with the information as if they were touching a real object. If this computing model becomes more prevalent, the place where information is viewed and shared will not be a display of a personal computer (PC) or a smartphone, but the real space itself. Thus, the technology for sharing a mixed reality space between a plurality of people in MR is expected to become increasingly important in the future.

Microsoft provides a space sharing service (hereinafter referred to as "sharing service") (e.g., see NPL 8) to enable mixed reality spaces to be easily shared. In this sharing service, information (anchor information) for anchoring a virtual object in a mixed reality space is shared between MR terminals via a server in order to share the mixed reality space between different MR terminals. Each MR terminal that receives the anchor information displays the virtual object at a relative position with respect to the coordinates calculated based on the anchor information. Each MR terminal can thus display the virtual object at the same position in a real space, which is a specific area such as a chamber, so that a plurality of users can view the same mixed reality space. Information regarding the shared mixed reality space is managed as a room in a server program, and the anchor information is also stored in this room. In the program, the sharing of the mixed reality space is realized by transmitting the anchor information to MR terminals that are associated with the same room.

CITATION LIST

Non Patent Literature

[NPL 1] "Microsoft Hololens: Mixed Reality Technology to Support Business" [Online], [Retrieved on Jun. 24, 2019]

[NPL 2] Taleb, Tarik, et al. "PERMIT: Network slicing for personalized 5G mobile telecommunications," IEEE Communications Magazine, 55 (5), pp. 88-93, 2017.

[NPL 3] Debandi, Federico, et al. "Enhancing cultural tourism by a mixed reality application for outdoor navigation and information browsing using immersive devices," IOP Conference Series: Materials Science and Engineering, 364 (1), pp. 12-48, 2018.

[NPL 4] "How Microsoft Jumped on Apple's Laptop Stumbles-Bloomberg" [Online], [Retrieved on Jun. 24, 2019]

[NPL 5] "Layout Microsoft Dynamics 365" [Online], [Retrieved on Jun. 24, 2019]

[NPL 6] "Remote Aassist|Microsoft Dynamics 365" [Online], [Retrieved on Jun. 24, 2019]

[NPL 7] "Japan's First! Employ Microsoft Holorens for Condominium Sales" [Online], [Retrieved on Jun. 24, 2019]

[NPL 8] "GitHub-microsoft/MixedReality Toolkit at c562ff9582cd 10ea0448fd846f7b2bb261 e8f551" [Online], [Retrieved on Jun. 24, 2019]

SUMMARY OF THE INVENTION

Technical Problem

As mentioned above, anchor information for anchoring 3D information regarding a real space and a virtual object in a mixed reality space is managed in association with a virtual room for each specific area (chamber etc.) by a server. As a result of the anchor information being shared between MR terminals via the server, the same mixed reality space can be shared between a plurality of MR terminals. In this case, to actually share the mixed reality space, it is necessary for users to sense every corner of a targe real space in advance for respective MR terminals so that the MR terminals recognize 3D information regarding the real space.

For this reason, the larger the target real space is, the longer it takes to preprocess information.

This invention has been made in view of the foregoing circumstances, and an object of the invention is to provide a mixed reality space sharing system, a shared information management server, a mixed reality terminal, a mixed reality space sharing method, and a shared information management program that enable 3D information regarding a target real space to be shared between a plurality of MR terminals without spending a long processing time.

Means for Solving the Problem

To solve the above problem, a first aspect of this invention is a mixed reality space sharing system including: a plurality of mixed reality terminals each of which creates a mixed reality space in which virtual information is mapped onto 3D information regarding a real space based on the 3D information and anchor information for anchoring the virtual information, and visualizing the mixed reality space; and a shared information management server to which the plurality of mixed reality terminals are connected, wherein a first terminal, which is at least one of the plurality of mixed reality terminals, includes: a 3D sensor for sensing the real space and acquiring the 3D information; and an upload unit for transmitting the 3D information acquired by the 3D sensor and the anchor information to the shared information management server, the shared information management server includes: an information management unit for creating a room by associating the 3D information and the anchor information transmitted from the first terminal with each other, and managing the 3D information; and a sharing unit for transmitting the 3D information and the anchor information to a second terminal different from the first terminal, of the plurality of mixed reality terminals, and the second terminal includes a download unit for downloading the 3D information and the anchor information that are transmitted from the shared information management server, and creates the mixed reality space using the downloaded 3D information and anchor information.

A second aspect of this invention is a shared information management server including: an information management unit for creating a room by associating 3D information regarding a real space and anchor information for anchoring virtual information with each other, and managing, the 3D information and the anchor information being used by a plurality of mixed reality terminals each of which creates a mixed reality space in which virtual information is mapped onto the 3D information based on the 3D information and the anchor information, and visualize the mixed reality space; and a sharing unit for transmitting the 3D information and the anchor information to a mixed reality terminal that has made a request, of the plurality of mixed reality terminals, in accordance with the request.

A third aspect of this invention is a plurality of mixed reality terminals each of which create a mixed reality space in which virtual information is mapped onto 3D information regarding a real space based on the 3D information and anchor information for anchoring the virtual information, and visualizes the mixed reality space, each of the plurality of mixed reality terminals including: a 3D sensor for sensing the real space and acquiring the 3D information; and an upload unit for transmitting the 3D information acquired by the 3D sensor and the anchor information to a shared information management server; and an updated information upload unit for periodically comparing the 3D information acquired by the 3D sensor with immediately previous information, and transmitting, as updated information, 3D information of only a portion with a significant change to the shared information management server.

A fourth aspect of this invention is a mixed reality space sharing method to be used in a mixed reality space sharing system including: a plurality of mixed reality terminals each of which creates a mixed reality space in which virtual information is mapped onto 3D information regarding a real space based on the 3D information and anchor information for anchoring the virtual information, and visualizing the mixed reality space; and a shared information management server to which the plurality of mixed reality terminals are connected, the method including: uploading the 3D information acquired by sensing the real space and the anchor information to the shared information management server from a first terminal, which is at least one of the plurality of mixed reality terminals; creating a room by associating the 3D information and the anchor information uploaded from the first terminal with each other, and managing the 3D information, in the shared information management server; transmitting the managed 3D information and anchor information to a second terminal different from the first terminal, of the plurality of mixed reality terminals, in accordance with a request from the second terminal; and downloading the 3D information and the anchor information that are transmitted from the shared information management server, and creating the mixed reality space using the downloaded 3D information and anchor information, in the second terminal.

A fifth aspect of this invention is a shared information management program to be executed by a plurality of mixed reality terminals each of which creates a mixed reality space in which virtual information is mapped onto 3D information regarding a real space based on the 3D information and anchor information for anchoring the virtual information, and visualizes the mixed reality space, and a processor of a shared information management server to which the plurality of mixed reality terminals are connected, the program causing the processor to function as: an information management unit for creating a room by associating the 3D information and the anchor information used by the plurality of mixed reality terminals with each other, and managing the 3D information; and a sharing unit for transmitting the 3D information and the anchor information to a mixed reality terminal that has made a request, of the plurality of mixed reality terminals, in accordance with the request.

Effects of the Invention

According to each aspect of this invention, a mixed reality space sharing system, a shared information management server, a mixed reality terminal, a mixed reality space sharing method, and a shared information management program can be provided that enable 3D information regarding a target real space to be shared between a plurality of MR terminals without spending a long processing time, by managing the 3D information regarding a real space corresponding to a room by the shared information management server.

BRIEF DESCRIPTION OF DRAWINGS

FIG. 8 is a schematic diagram for illustrating processing for sharing 3D information regarding a real space between two MR terminals.

FIG. 9 is a diagram showing an example of shared information managed by the shared information management server when 3D information regarding a real space is shared between two MR terminals.

FIG. 10 is a schematic diagram for illustrating processing for sharing 3D information regarding a real space when a third MR terminals joins.

FIG. 11 is a diagram that shows an example of shared information managed by the shared information management server when 3D information regarding a real space is shared between three MR terminals.

FIG. 12 is a diagram that shows a box to be sensed and 3D information regarding the box.

FIG. 13 is a schematic diagram for illustrating uploading of 3D information regarding a real space.

DESCRIPTION OF EMBODIMENTS

Figure 1:
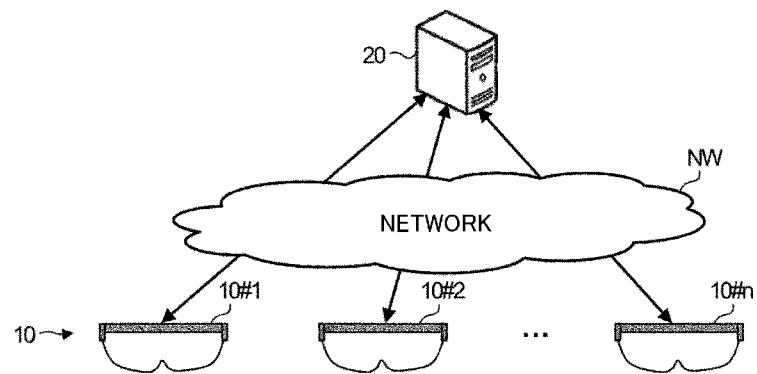
FIG. 1 is a diagram that shows an overall configuration of a mixed reality space sharing system according to one embodiment of this invention.

Hereinafter, an embodiment related to this invention will be described with reference to the drawings.
(Configuration)
(1) System FIG. 1 is a diagram that shows an overall configuration of a mixed reality space sharing system according to an embodiment of this invention. This mixed reality space sharing system is a server-client system in which a plurality of clients are connected to a server. The mixed reality space sharing system includes a plurality of MR terminals 10 #1, 10 #2, . . . , 10 #n (n is an integer) (hereinafter also referred to collectively as "MR terminals 10"), and a sharing server 20. The MR terminals 10 can communicate with the sharing server 20 via a communication network NW as necessary.

Each MR terminal 10 is a mixed reality terminal according to one embodiment of this invention that acquires 3D information regarding a real space, and creates and visualizes a mixed reality space in which virtual information is mapped onto 3D information based on anchor information for anchoring the virtual information.

The sharing server 20 is a shared information management server according to one embodiment of this invention that is constituted by, for example, a server computer, a personal computer in which a server program operates, or the like, creates a room by associating 3D information and anchor information transmitted from the MR terminals 10 with each other, and manages shared information regarding the room.

Figure 2:
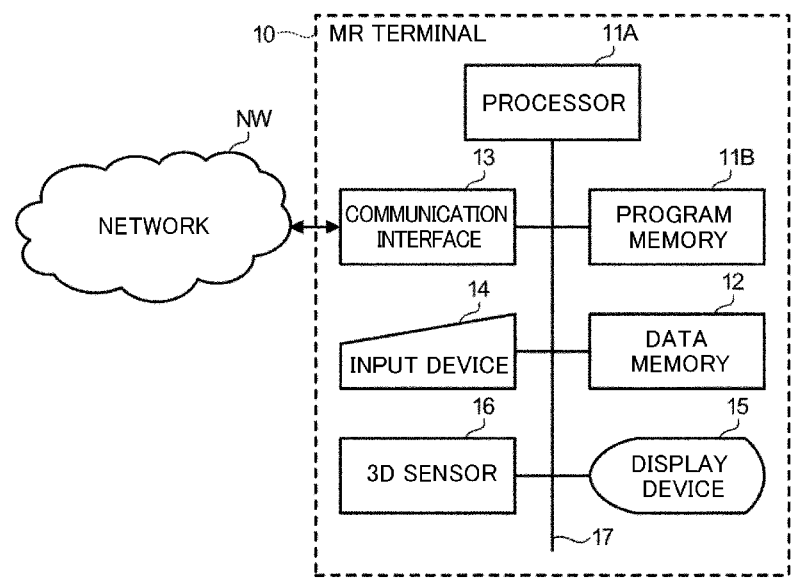
FIG. 2 is a block diagram that shows a hardware configuration of an MR terminal serving as a mixed reality terminal according to one embodiment of this invention.

The communication network NW is constituted by, for example, an IP (Internet Protocol) network, which is typified by the Internet, and a plurality of access networks for accessing this IP network. Not only wired access networks that use optical fiber, but also wireless access networks such as a mobile phone network that operates under the standard such as 3G, 4G, or 5G, and a wired LAN (Local Area Network) are used as the access networks. It is desirable that wireless access networks are used as the access networks between the MR terminals 10 and the IP network is. The access network between the sharing server 20 and the IP network may be either a wired or wireless access network.
(2) MR Terminal
(2-1) Hardware Configuration FIG. 2 is a block diagram that shows an example of a hardware configuration of each MR terminal 10 shown in FIG. 1. The MR terminal 10 is constituted by, for example, a holographic computer or the like that is capable of 3D display, and has a hardware processor 11A such as a CPU (Central Processing Unit). A program memory 11B, a data memory 12, a communication interface 13, an input device 14, a display device 15, and a 3D sensor 16 are connected to the hardware processor 11A via a bus 17.

The program memory 11B is a combination of storage media that are, for example, a nonvolatile memory such as an SSD (Solid State Drive) to and from which data can be written and read at any time and a nonvolatile memory such as a ROM (Read Only Memory), and a program required to execute various kinds of processing is stored therein.

The data memory 12 is a combination of storage media that are, for example, a nonvolatile memory such as an SSD to and from which data can be written and read at any time and a volatile memory such as a RAM (Random Access Memory), and is used to store data acquired and created in the course of various kinds of processing.

The communication interface 13 enables data to be transmitted to and received from the sharing server 20 via the communication interface NW. A protocol defined by the communication network NW is used as the communication protocol. For example, an interface that employs a low-power wireless data communication standard, such as a wireless LAN or Bluetooth (registered trademark), can be used as the communication interface 13.

The display device 15 is a user interface that presents a mixed reality space constructed through processing performed by the processor 11A to the user. The display device 15 may be a head-mounted display in which the mixed reality space is projected onto a transmission holographic lens, for example.

The input device 14 is a user interface for accepting an instruction from the user and notifying the processor 11A of the instruction. The input device 14 may include a keyboard, a touch panel, an operation button, a pointing device such as a mouse, or the like.

The 3D sensor 16 is a sensor for acquiring a real space as 3D information. The processor 11A can perform processing to mix a virtual space with a real space and construct a mixed reality space by creating a 3D model of the real space based on 3D information regarding the real space acquired by the 3D sensor 16 and mapping the virtual information onto the 3D model.

(2-2) Software Configuration

Figure 3:
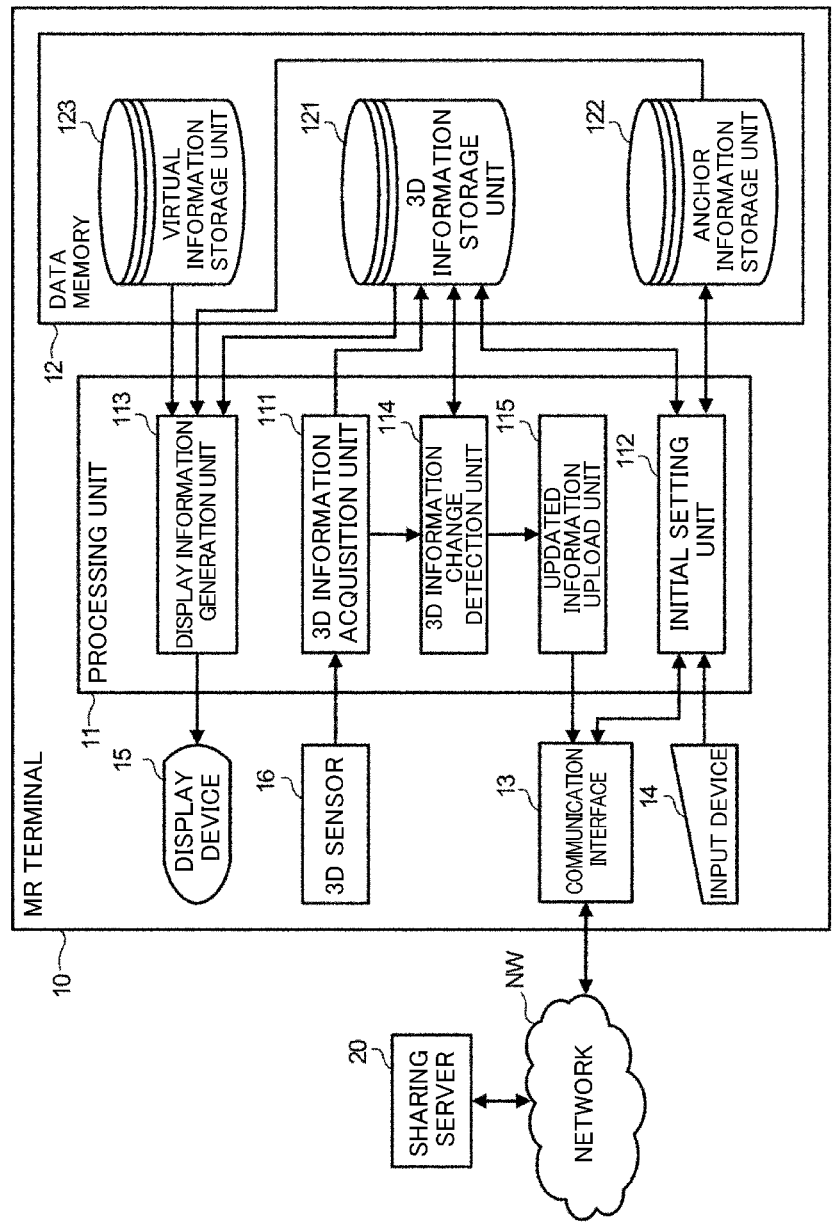
FIG. 3 is a block diagram that shows a software configuration of the MR terminal in FIG. 2.

FIG. 3 is a block diagram that shows a software configuration of the MR terminals 10 shown in FIG. 1 in association with the hardware configuration shown in FIG. 2.

The storage area of the data memory 12 includes a 3D information storage unit 121, an anchor information storage unit 122, and a virtual information storage unit 123.

The 3D information storage unit 121 is used to store 3D information regarding the real space. The 3D information regarding the real space stored in this 3D information storage unit 121 may be that acquired by the 3D sensor 16, or that acquired by another MR terminal 10 and downloaded from the sharing server 20 via the network NW.

The anchor information storage unit 122 is used to store anchor information. The anchor information stored in the anchor information storage unit 122 may be that generated by this MR terminal 10, or that generated by another MR terminal 10 and downloaded from the sharing server 20 via the network NW.

The virtual information storage unit 123 stores virtual information that is mapped onto the 3D model of a real space that is created based on 3D information regarding the real space. In this embodiment, any method of creating virtual information may be employed. The virtual information may be created by this MR terminal 10, or may be downloaded from an external device via the network NW or the like.

The processing unit 11 is constituted by the aforementioned hardware processor 11A and program memory 11B, and includes processing functional units realized by software, namely a 3D information acquisition unit 111, an initial setting unit 112, a display information generation unit 113, a 3D information change detection unit 114, and an updated information upload unit 115. All of these processing functional units are realized by causing the aforementioned hardware processor 11A to execute the program stored in the program memory 11B. The processing unit 11 may also be realized in any of various other forms, including integrated circuits such as an ASIC (Application Specific Integrated Circuit) and an FPGA (field-programmable gate array).

The 3D information acquisition unit 111 performs processing to store 3D information regarding the real space acquired by the 3D sensor 16 in the 3D information storage unit 121.

Figure 4:
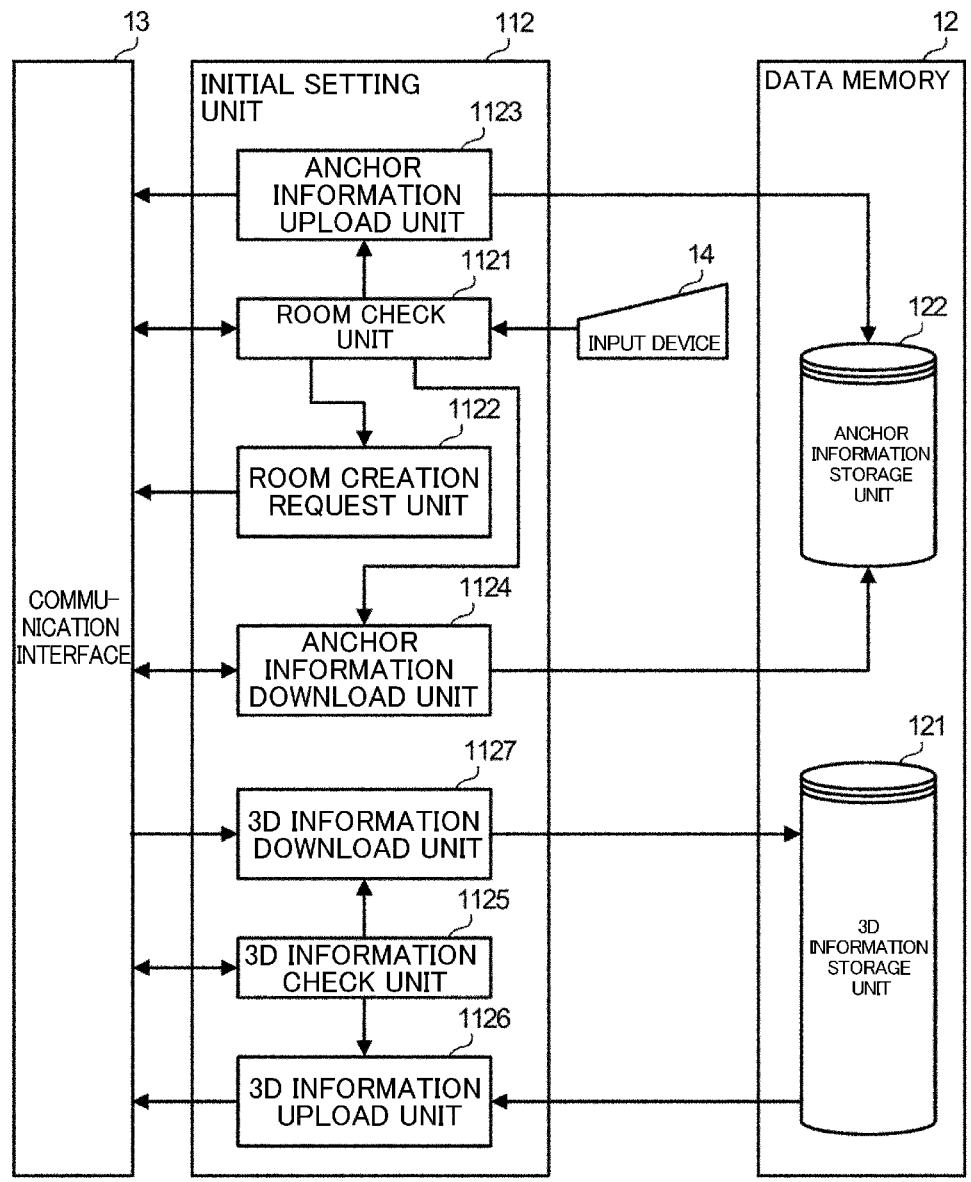
FIG. 4 is a block diagram that shows a configuration of an initial setting unit in FIG. 3.

FIG. 4A is a block diagram that shows a configuration of the initial setting unit 112. This initial setting unit 112 includes a room check unit 1121, a room creation request unit 1122, an anchor information upload unit 1123, an anchor information download unit 1124, a 3D information check unit 1125, a 3D information upload unit 1126, and a 3D information download unit 1127.

The room check unit 1121 performs processing to make an inquiry about whether or not a mixed reality space recognized by this MR terminal 10 is managed by the sharing server 20, to the sharing server 20 via the communication network NW using the communication interface 13. That is to say, the room check unit 1121 performs processing to make an inquiry about the existence of a room corresponding to the mixed reality space recognized by this MR terminal 10 to the sharing server 20. This inquiry can be made by transmitting a check message that includes the name of the room to the sharing server 20.

The room creation request unit 1122 performs processing to give an instruction to create a new room to the sharing server 20 via the communication network NW using the communication interface 13 if the room check unit 1121 receives a reply indicating that no corresponding room is present from the sharing server 20.

The anchor information upload unit 1123 performs processing to generate anchor information in the mixed reality space recognized by this MR terminal 10, similarly if the room check unit 1121 receives a reply indicating that no corresponding room is present from the sharing server 20. The anchor information upload unit 1123 then performs processing to upload the generated anchor information to the sharing server 20 via the communication network NW using the communication interface 13. At this time, the anchor information upload unit 1123 also performs processing to store the generated anchor information in the anchor information storage unit 122.

The anchor information download unit 1124 performs processing to make a request to transmit anchor information, to the sharing server 20 via the communication network NW using the communication interface 13 if the room check unit 1121 receives a reply indicating that the room exists from the sharing server 20. The anchor information download unit 1124 then performs processing to download the anchor information transmitted from the sharing server 20 and store the downloaded anchor information in the anchor information storage unit 122.

The 3D information check unit 1125 performs processing to make an inquiry about whether or not 3D information relating to the mixed reality space recognized by this MR terminal 10 is managed by the sharing server 20, to the sharing server 20 via the communication network NW using the communication interface 13.

The 3D information upload unit 1126 performs processing to upload 3D information regarding the real space stored in the 3D information storage unit 121 to the sharing server 20 via the communication network NW if the 3D information check unit 1125 receives, from the sharing server 20, a reply that is a request to transmit 3D information due to the absence of the 3D information.

If the 3D information check unit 1125 receives a reply that is 3D information regarding the real space uploaded by another MR terminal 10 due to the existence of 3D information from the sharing server 20, the 3D information download unit 1127 performs processing to download the corresponding 3D information from the sharing server 20 via the communication network NW using the communication interface 13. The 3D information download unit 1127 performs processing to store the download 3D information regarding the real space in the 3D information storage unit 121.

The display information generation unit 113 performs processing to generate a 3D model of a real space based on 3D information regarding the real space stored in the 3D information storage unit 121. Furthermore, the display information generation unit 113 performs processing to mix a virtual space with a real space to construct a mixed reality space by mapping a virtual object corresponding to virtual information stored in the virtual information storage unit 123 to the above-created 3D model. Here, the display information generation unit 113 arrange the virtual object at a relative position from coordinates calculated based on the anchor information stored in the anchor information storage unit 122. The display information generation unit 113 then performs processing to present the constructed mixed reality space to the user using the display device 15.

The 3D information change detection unit 114 performs processing to detect whether or not the 3D information has changed, based on the current 3D information regarding the real space acquired by the 3D information acquisition unit 111 and the 3D information regarding the real space stored in the 3D information storage unit 121. If it is detected that the 3D information has changed, the 3D information change detection unit 114 performs processing to update the 3D information regarding the real space stored in the 3D information storage unit 121 with the current 3D information regarding the real space acquired by the 3D information acquisition unit 111 and store the updated 3D information in the 3D information storage unit 121. Furthermore, if it is detected that the 3D information has changed, the 3D information change detection unit 114 performs processing to supply the current 3D information regarding the real space to the updated information upload unit 115. In this case, however, the 3D information change detection unit 114 supplies, to the updated information upload unit 115, only a portion of the 3D information that corresponds to the portion at which the change has been detected, rather than the entire current 3D information regarding the real space, as will be described in detail later.

The updated information upload unit 115 performs processing to upload the information of the changed portion of the current 3D information regarding the real space supplied from the 3D information change detection unit 114, to the sharing server 20 via the communication network NW using the communication interface 13.

Note that the processing unit 11 of each MR terminal 10 of the present invention is realized by the processor 11A, which is a computer, and the program stored in the program memory 11B. This program can also be provided to the MR terminal 10 by being recorded in a non-transitory computer-readable medium, or via a network. The thus-provided program can be stored in the program memory 11B. Alternatively, the processor 11A can also function as the processing unit 11 as a result of the provided program being stored in the data memory 12, which is a storage, and executed by the processor 11A as necessary.

(3) Sharing Server
(3-1) Hardware Configuration

Figure 5:
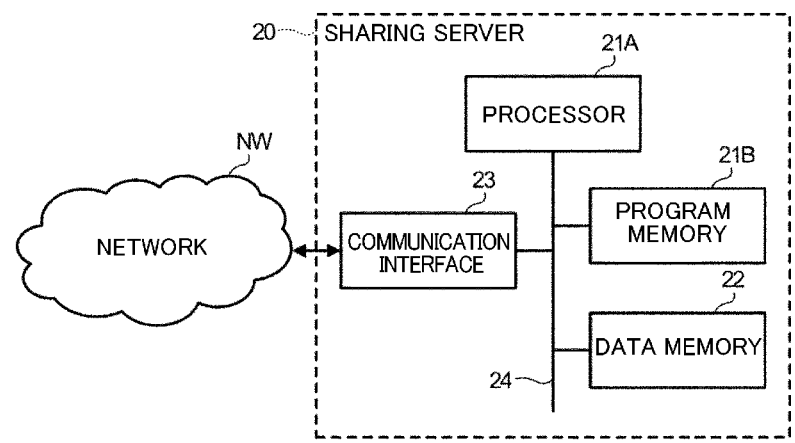
FIG. 5 is a block diagram that shows a hardware configuration of a sharing server serving as a shared information management server according to one embodiment of this invention.

FIG. 5 is a block diagram that shows an example of a hardware configuration of the sharing server 20 shown in FIG. 1.

The sharing server 20 is constituted by, for example, a server computer, a personal computer, or the like, and has a hardware processor 21A, such as a CPU. A program memory 21B, a data memory 22, and a communication interface 23 are connected to the hardware processor 21A via a bus 24.

The program memory 21B is a combination of storage media that are, for example, a nonvolatile memory such as an HDD (Hard Disk Drive) or an SSD to and from which data can be written and read at anytime and a nonvolatile memory such as a ROM, and a program required to execute various kinds of processing is stored therein.

The data memory 22 is a combination of storage media that are, for example, a nonvolatile memory such as an HDD or an SSD to and from which data can be written and read at any time and a volatile memory such as a RAM, and is used to store data acquired and created in the course of performing various kinds of processing.

The communication interface 23 enables data to be transmitted to and received from the MR terminals 10 via the communication network NW. A protocol defined by the communication network NW is used as the communication protocol. For example, a wired LAN is used as the communication interface 23. An interface that employs a low-power wireless data communication standard, such as a wireless LAN or Bluetooth (registered trademark), may be used as the communication interface 23.

(3-2) Software Configuration

Figure 6:
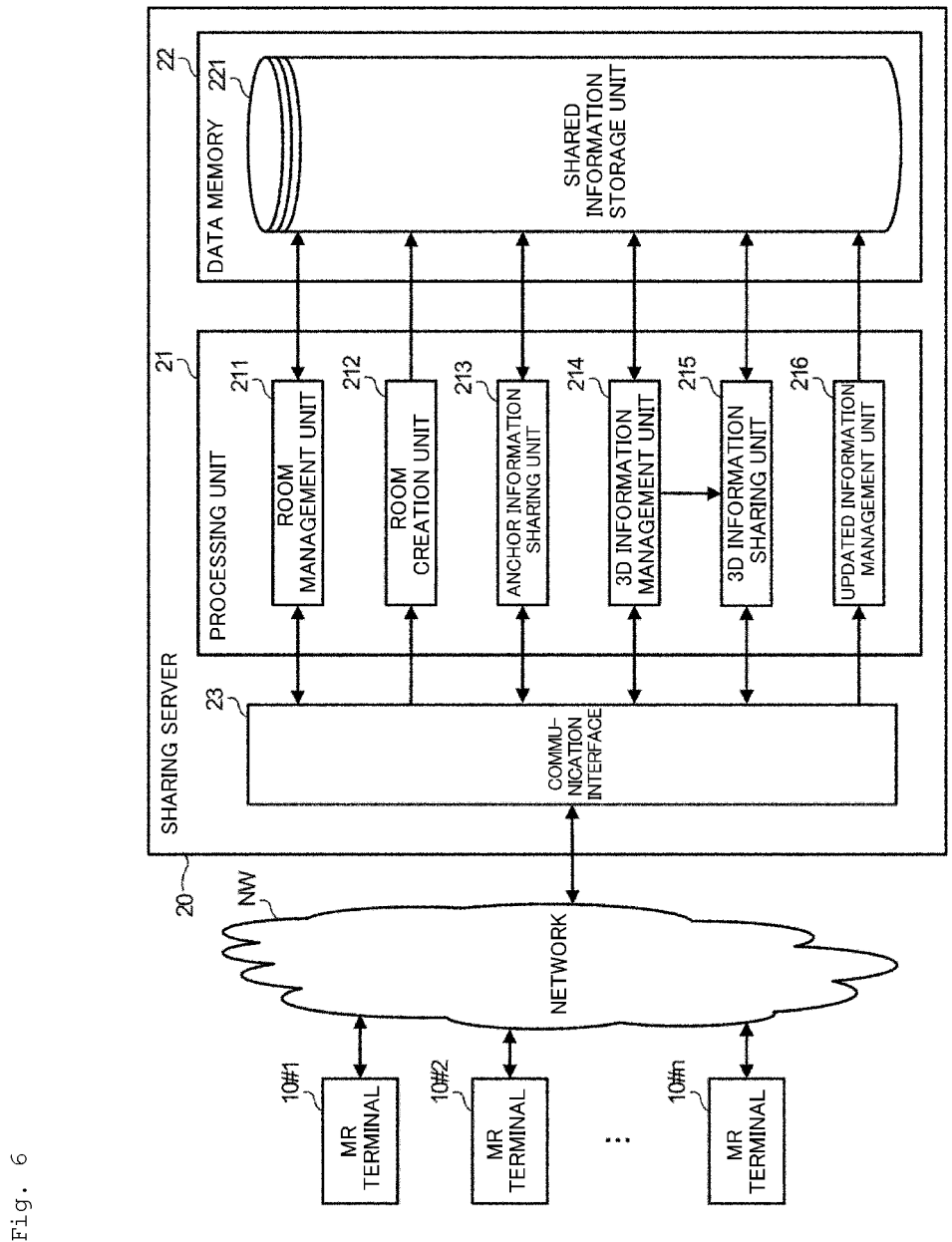
FIG. 6 is a block diagram that shows a software configuration of the sharing server in FIG. 5.

FIG. 6 is a block diagram that shows a software configuration of the sharing server 20 shown in FIG. 1 in association with the hardware configuration shown in FIG. 5.

As mentioned above, the sharing server 20 can communicate with the plurality of MR terminals 10 #1, 10 #2, 10 #n via the communication network NW.

The storage area of the data memory 22 includes a shared information storage unit 221. This shared information storage unit 221 is used to store shared information relating to a room that is created in association with 3D information and anchor information transmitted from one MR terminal 10.

The processing unit 21 is constituted by the aforementioned hardware processor 21A and program memory 21B, and includes processing functional units realized by software, namely a room management unit 211, a room creation unit 212, an anchor information sharing unit 213, a 3D information management unit 214, a 3D information sharing unit 215, and an updated information management unit 216. All of these processing functional units are realized by causing the aforementioned hardware processor 21A to execute the program stored in the program memory 21B. The processing unit 21 may alternatively be realized in any of various other forms, including integrated circuits such as an ASIC and an FPGA.

If a check message containing the name of a room transmitted from the room check unit 1121 of any of the MR terminals 10 via the communication network NW is received, the room management unit 211 performs processing to check whether or not shared information regarding the room is stored in the shared information storage unit 221. The room management unit 211 then performs processing to return the check result to the MR terminal 10 that has transmitted the message, via the communication network NW using the communication interface 13. Note that if, at this time, the shared information regarding the room is stored in the shared information storage unit 221, the room management unit 211 associates the MR terminal 10 with the room by registering ID information for identifying the MR terminal 10 that has transmitted the check message, to the shared information regarding the room stored in the shared information storage unit 221. In the following, this processing is expressed as "letting an MR terminal 10 enter a room". ID information regarding each MR terminal 10 can be included in the check message and transmitted from the MR terminal 10.

If an instruction to create a new room that is transmitted from the room creation request unit 1122 of any of the MR terminals 10 via the communication network NW is received, the room creation unit 212 performs processing to create a new room. That is to say, the room creation unit 212 performs processing to reserve an area for storing shared information regarding the new room in the shared information storage unit 221.

If anchor information relating to the new room that is transmitted from the anchor information upload unit 1123 of any of the MR terminals 10 via the communication network NW is received, the anchor information sharing unit 213 performs processing to store the received anchor information in the area for storing shared information regarding the new room that is reserved in the shared information storage unit 221. Thus, the received anchor information is associated with the new room. Further, if a request to transmit anchor information is received that is transmitted, via the communication network NW, from the anchor information download unit 1124 of any of the MR terminals 10 that is in a room regarding which shared information is already stored in the shared information storage unit 221, the anchor information sharing unit 213 reads out the anchor information associated with the room from the shared information storage unit 221. The anchor information sharing unit 213 then performs processing to transmit the read anchor information to the MR terminal 10 that has made the request, via the communication network NW using the communication interface 13.

If an inquiry about whether or not 3D information regarding a real space to be shared for a room is managed by the sharing server 20 is received, the inquiry being transmitted, via the communication network NW, from the 3D information check unit 1125 of any of the MR terminals 10 that are in the room, the 3D information management unit 214 performs processing to check whether or not the 3D information is stored in the shared information storage unit 221. If the check result indicates that the corresponding 3D information is stored, the 3D information management unit 214 then performs processing to transmit the 3D information to the MR terminal 10 that has made the inquiry, via the communication network NW using the communication interface 13.

If 3D information is received that is uploaded via the communication network NW from the 3D information upload unit 1126 of any of the MR terminals 10 that are in the room, the 3D information sharing unit 215 performs processing to store the received 3D information as shared information regarding the corresponding room, in the shared information storage unit 221. If the 3D information management unit 214 confirms that the 3D information about which the inquiry has been made from the MR terminal 10 is stored in the shared information storage unit 221, the 3D information sharing unit 215 performs processing to read out the 3D information from the shared information storage unit 221 and transmit the read 3D information to the MR terminal 10 that has made the inquiry, via the communication network NW using the communication interface 13.

The updated information management unit 216 receives information of a changed portion of the current 3D information regarding a real space that is uploaded from the updated information upload unit 115 of any of the MR terminals 10 that are in the room via the communication network NW. The updated information management unit 216 then performs processing to update, with the received information, the portion of the 3D information regarding the real space stored as shared information regarding the corresponding room in the shared information storage unit 221.

Note that the processing unit 21 of the sharing server 20 of the present invention is realized by the processor 21A, which is a computer, and a program stored in the program memory 21B, but this program can also be provided to the sharing server 20 by being recording in a non-transitory computer-readable medium, or via a network. The thus-provided program can be stored in the program memory 21B. Alternatively, the processor 21A can also function as the processing unit 21 as a result of the provided program being stored in the data memory 22, which is a storage, and executed by the processor 21A as necessary.

(Operation)

Figure 7A:
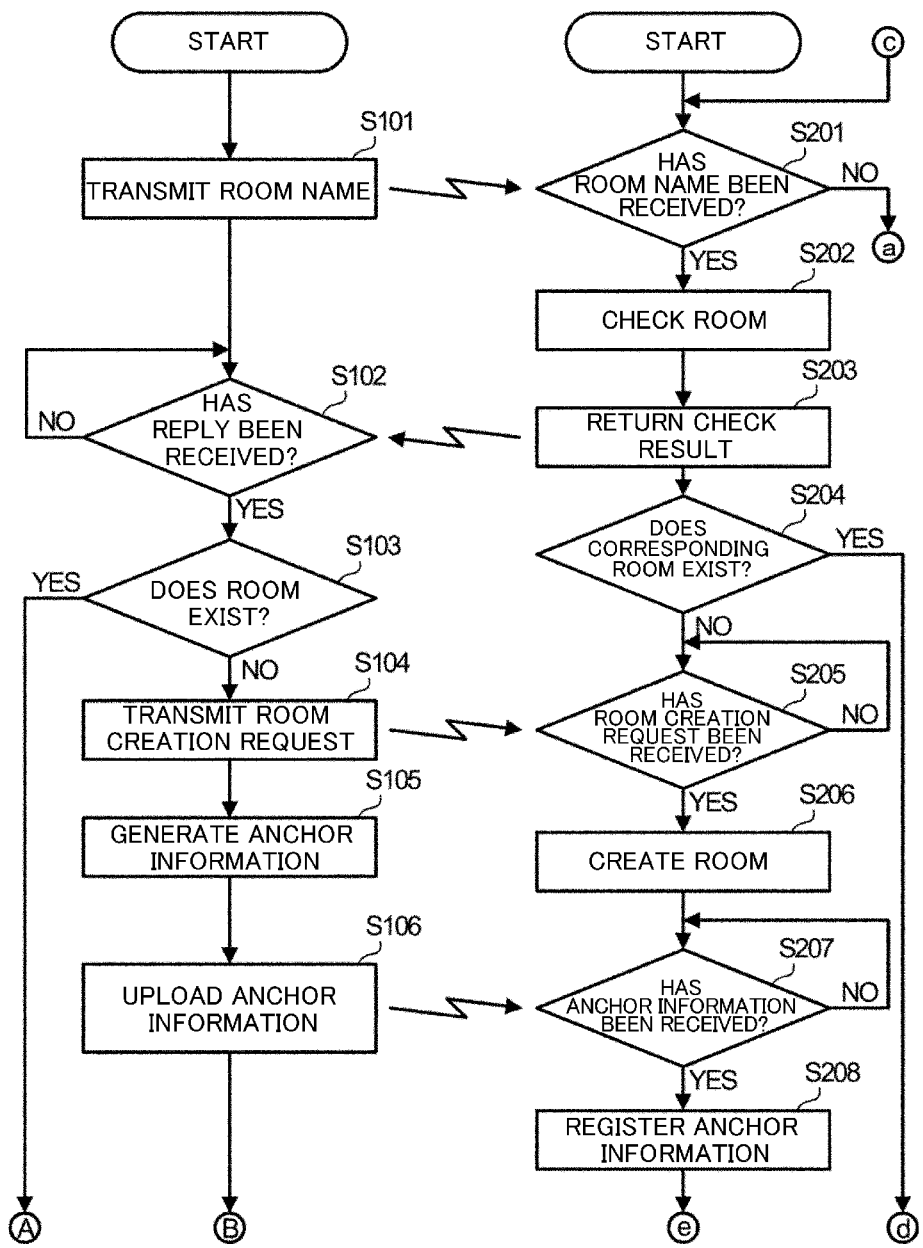
FIG. 7A is a diagram that shows first parts of flowcharts showing an example operation in processing related to sharing of a mixed reality space between a plurality of MR terminals performed by processing units of the MR terminal and the sharing server in FIG. 1.
Figure 7B:
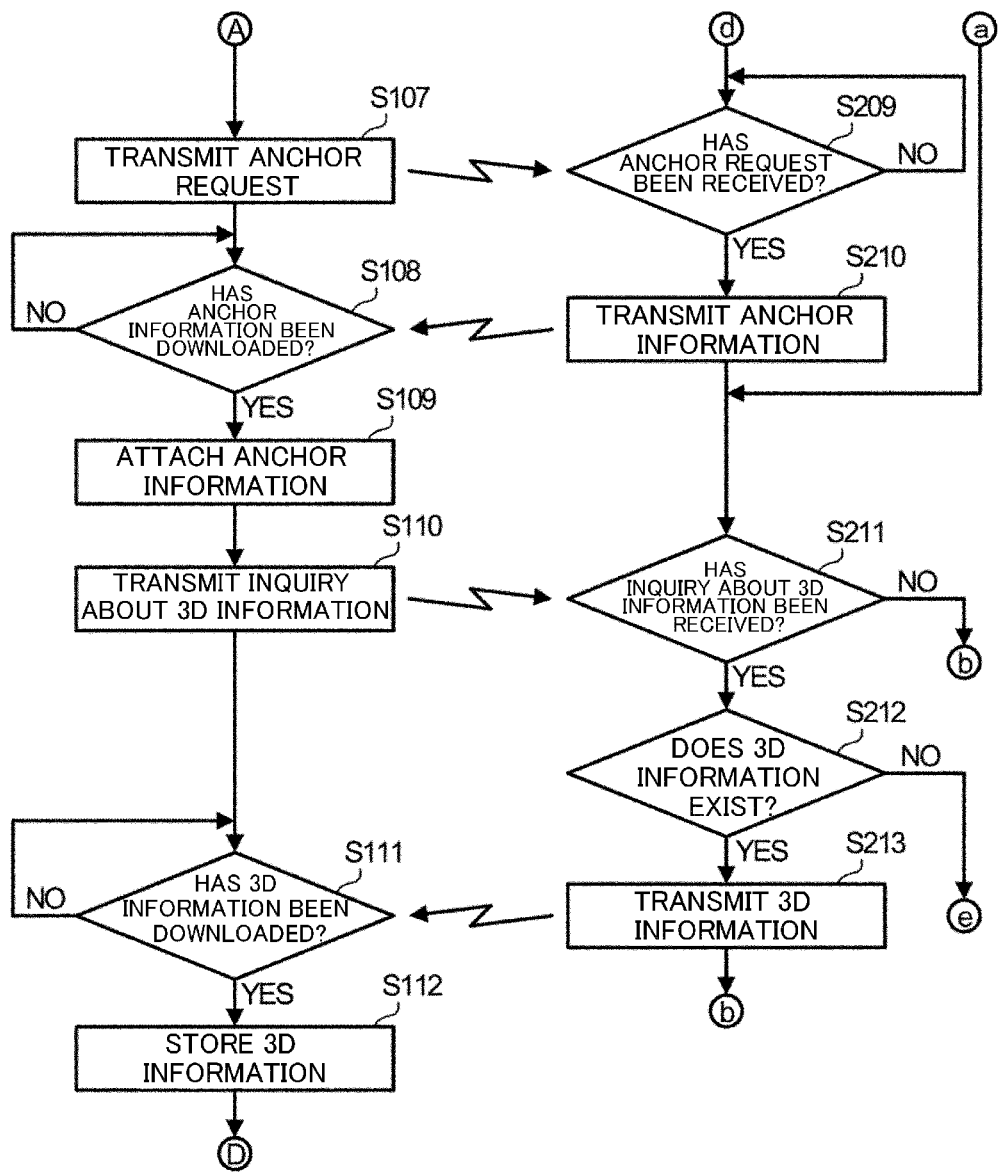
FIG. 7B is a diagram that shows second parts of the flowcharts showing the example operation in processing related to sharing of a mixed reality space between a plurality of MR terminals performed by the processing units of the MR terminal and the sharing server in FIG. 1.
Figure 7C:
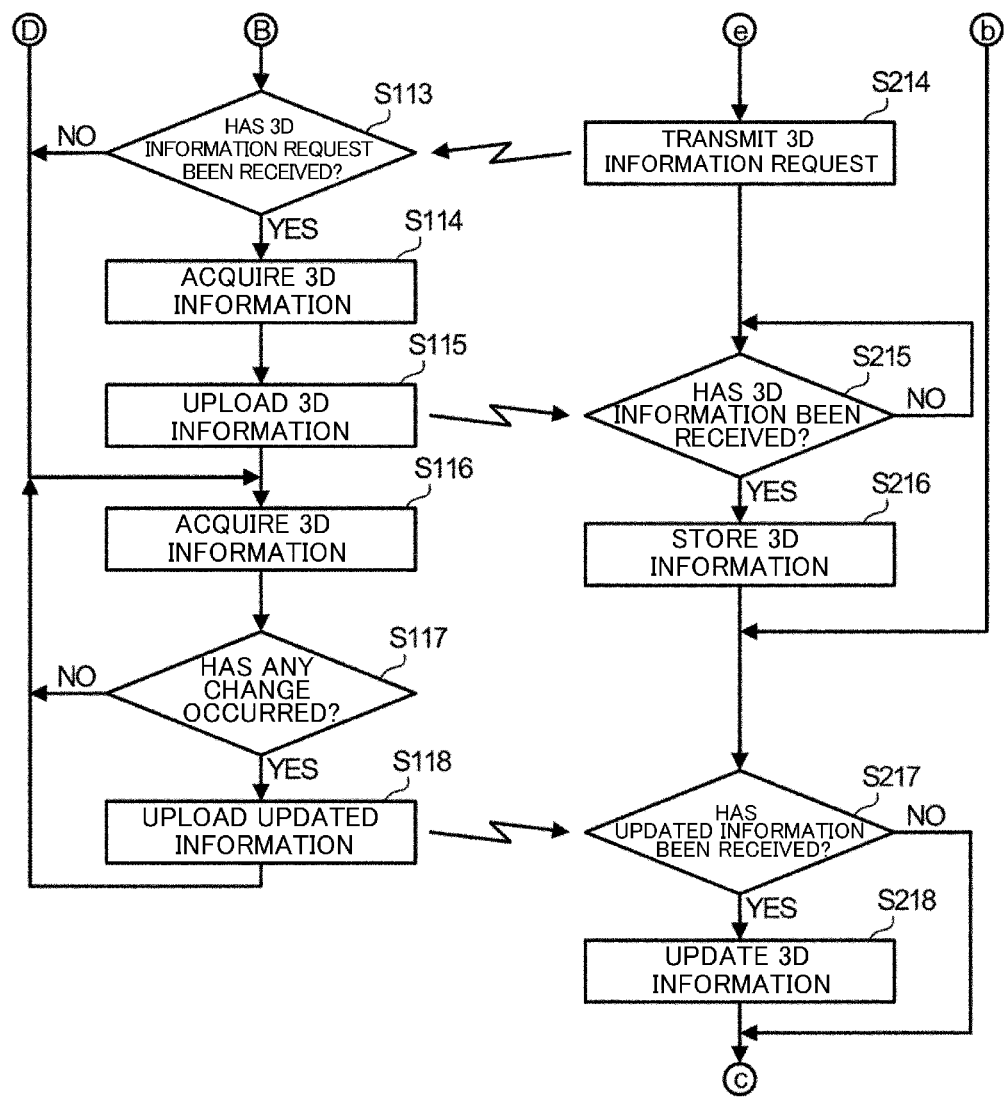
FIG. 7C is a diagram that shows third parts of the flowcharts showing the example operation in processing related to sharing of a mixed reality space between a plurality of MR terminals performed by the processing units of the MR terminal and the sharing server in FIG. 1.

Next, a description will be given of an operation of the mixed reality space sharing system that is configured as described above. FIGS. 7A to 7C are diagrams that show a series of flowcharts illustrating an example operation in processing performed by the processor 11A (processing unit 11) of each MR terminal 10 and a series of flowcharts illustrating an example operation in processing performed by the processor 21A (processing unit 21) of the sharing server 20. These flowcharts only show portions of processing related to sharing a mixed reality space between a plurality of MR terminals.

It is assumed here that the MR terminal 10 is already in a state of being connected to the sharing server 20 via the communication network NW through a predetermined procedure. That is to say, the processor 11A of the MR terminal 10 connected to the sharing server 20 first causes the room check unit 1121 of the initial setting unit 112 to make an inquiry to the sharing server 20 about whether or not a mixed reality space recognized by this MR terminal 10 is managed by the sharing server 20, that is, about the existence of a room corresponding to the mixed reality space recognized by this MR terminal 10. This inquiry is made by transmitting a check message containing the name of the room to the sharing server 20 (step S101). Thereafter, the processor 11A causes the room check unit 1121 to wait for a reply from the sharing server 20 (step S102).

The processor 21A of the sharing server 20 waits for reception from the MR terminal 10 in the later-described processing loops in steps S201, S211, and S217.

If the room management unit 211 receives a check message containing the name of the room from the room check unit 1121 of any of the MR terminals 10 (YES in step S201), the processor 21A of the sharing server 20 checks whether or not shared information regarding the corresponding room is stored in the shared information storage unit 221 of the data memory 22 (step S202). At this time, if the shared information regarding the corresponding room is stored in the shared information storage unit 221, the processor 21A causes the room management unit 211 to associate the MR terminal 10 that has transmitted the message with the room. That is to say, the processor 21A lets the MR terminal 10 that has transmitted the message enter the corresponding room. The processor 21A then causes the room management unit 211 to return the check result to the MR terminal 10 that has transmitted the message (step S203).

Thereafter, the processor 21A determines whether or not the check result in the above step S202 indicates that the corresponding room exists (step S204). Here, if the check result indicates that the corresponding room exists (YES in step S204), the processor 21A advances the processing to step S209, which will be described later. On the other hand, if the check result in the above step S202 indicates that the corresponding room does not exist (NO in step S204), the processor 21A causes the room creation unit 212 to wait for receiving a room creation request from the MR terminal 10 that has transmitted the aforementioned message (step S205).

If the room check unit 1121 receives a reply from the sharing server 20 (YES in step S102), the processor 11A of the MR terminal 10 that has transmitted the message determines whether or not the content of the reply indicates that the corresponding room exists (step S103). If the reply indicates that the corresponding room exists (YES in step S103), the processor 11A advances the processing to step S107, which will be described later. On the other hand, if the received reply indicates that the corresponding room does not exist (NO in step S103), the processor 11A causes the room creation request unit 1122 of the initial setting unit 112 to transmit a room creation request to the sharing server 20 such that a new room with the name is created on the sharing server 20 (step S104).

If the room creation unit 212 receives the room creation request from the MR terminal 10 (YES in step S205), the processor 21A of the sharing server 20 causes the room creation unit 212 to create the requested new room (step S206). That is to say the processor 21A causes the room creation unit 212 to reserve an area for storing shared information regarding the requested new room in the shared information storage unit 221. Thereafter, the processor 21A causes the anchor information sharing unit 213 to wait for receiving anchor information relating to the new room from the MR terminal 10 (step S207).

After transmitting the room creation request to the sharing server 20 in the above step S104, the processor 11A of the MR terminal 10 that has transmitted the message causes the anchor information upload unit 1123 to generate anchor information in the mixed reality space recognized by this MR terminal 10 by calculation, and store the generated anchor information in the anchor information storage unit 122 of the data memory 12 (step S105). The processor 11A then causes the anchor information upload unit 1123 to upload the generated anchor information to the sharing server 20 (step S106). Thereafter, the processor 11A advances the processing to step S113, which will be described later.

If the anchor information sharing unit 213 receives the anchor information relating to the new room (YES in step S207), the processor 21A of the sharing server 20 causes the anchor information sharing unit 213 to register the received anchor information to the shared information storage unit 221 (step S208). That is to say, the processor 21A causes the anchor information sharing unit 213 to associate the anchor information with the new room by storing the received anchor information in the area for storing shared information regarding the new room that is reserved in the shared information storage unit 221. Thereafter, the processor 21A advances the processing to step S214, which will be described later.

Meanwhile, if, in the above step S103, a reply indicating that the corresponding room exists is received from the sharing server 20 (YES in step S103), the processor 11A of the MR terminal 10 causes the anchor information download unit 1124 to make, to the sharing server 20, a request to transmit anchor information regarding the corresponding room (step S107). The processor 11A then causes the anchor information download unit 1124 to wait for receiving the anchor information from the sharing server 20 (step S108).

If, in the above step S204, the check result indicates that the corresponding room exists (YES in step S204), the processor 21A of the sharing server 20 causes the anchor information sharing unit 213 to wait for receiving a request to transmit anchor information from any of the MR terminals 10 that are in the room regarding which shared information is already stored in the shared information storage unit 221 (step S209). If a request to transmit anchor information is received from the MR terminal 10 (YES in step S209), the processor 21A causes the anchor information sharing unit 213 to read out anchor information associated with the room from the shared information storage unit 221 and transmit the read anchor information to the MR terminal 10 that has made the request (step S210). Thus, if a request for anchor information is received from another MR terminal 10 that are in the same room, the processor 21A transmits the anchor information to this MR terminal 10.

If, in the above step S108, the anchor information is received from the sharing server 20 (YES in step S108), the processor 11A of the MR terminal 10 causes the anchor information download unit 1124 to download the anchor information, and attach the downloaded anchor information to the mixed reality space recognized by this MR terminal 10 by storing the downloaded anchor information in the anchor information storage unit 122 of the data memory 12 (step S109). Thus, the MR terminals 10 that have entered the same room can acquire the same anchor information, and, as a result, the same mixed reality space can be viewed.

After the anchor information is shared as described above, the processor 11A of the MR terminal 10 checks with the sharing server 20 whether or not 3D information regarding the real space to be shared has been uploaded. That is to say, the processor 11A causes the 3D information check unit 1125 to transmit, to the sharing server 20, an inquiry about whether or not 3D information regarding the mixed reality space recognized by this MR terminal 10 is managed by the sharing server 20 (step S110).

After transmitting the anchor information in the above step S210, the processor 21A of the sharing server 20 causes the 3D information management unit 214 to determine whether or not an inquiry about 3D information regarding the real space to be shared for the room has been received from the 3D information check unit 1125 of any of the MR terminals 10 that are in the room (step S211). If no such inquiry has been received (NO in step S211), the processor 21A advances the processing to step S217, which will be described later. On the other hand, if such an inquiry has been received (YES in step S211), the processor 21A causes the 3D information management unit 214 to check whether or not the 3D information regarding the real space to be shared for the room is stored in the shared information storage unit 221 of the data memory 22 (step S212). If the corresponding 3D information is not stored in the shared information storage unit 221 (NO in step S212), the processor 21A advances the processing to step S214, which will be described later. If the corresponding 3D information is stored in shared information storage unit 221 (YES in step S212), the processor 21A causes the 3D information management unit 214 to read out the corresponding 3D information from the shared information storage unit 221 and transmit the read 3D information to the MR terminal 10 that has made the inquiry (step S213). Thereafter, the processor 21A advances the processing to step S217, which will be described later.

After transmitting the inquiry about the 3D information in the above step S110, the processor 11A of the MR terminal 10 waits for downloading of the 3D information from the sharing server 20 (step S111). After the 3D information is transmitted from the sharing server 20 (YES in step S111), the processor 11A causes the 3D information download unit 1127 to download the 3D information and store the downloaded 3D information in the 3D information storage unit 121 of the data memory 12 (step S112). Thus, the MR terminal 10 can recognize 3D information regarding the real space that is sensed and uploaded by another MR terminal 10, without sensing the real space. Thereafter, the processor 11A advances the processing to step S116, which will be described later.

On the other hand, if the 3D information is not uploaded, or if a new room is created, the MR terminal 10 needs to sense the target real space. If, in the above step S212, the corresponding 3D information is not stored in the shared information storage unit 221 (NO in step S212), the processor 21A of the sharing server 20 causes the 3D information management unit 214 to transmits a 3D information request for uploading the 3D information regarding the target real space to the MR terminal 10 that has made the inquiry (step S214). Thereafter, the processor 21A causes the 3D information sharing unit 215 to wait for receiving the 3D information from the MR terminal 10 (step S215).

After uploading the anchor information in the above step S106, the processor 11A of the MR terminal 10 causes the 3D information check unit 1125 to determine whether or not the 3D information request has been received from the sharing server 20 (step S113). If the 3D information request has not been received (NO in step S113), the processor 11A advances the processing to step S116, which will be described later. On the other hand, if the 3D information request has been received (YES in step S113), the processor 11A causes the 3D information check unit 1125 to notify the user that there is no 3D information on the sharing server 20, using the display device 15 or a speaker (not shown), for example, and have the user acquire 3D information by sensing the target real space using the MR terminal 10 (step S114). The 3D information acquired by the 3D sensor 16 is stored in the 3D information storage unit 121 of the data memory 12 by the 3D information acquisition unit 111. Thereafter, the processor 11A causes the 3D information upload unit 1126 to upload the 3D information stored in the 3D information storage unit 121 to sharing server 20 (step S115).

If, in the above step S215, the 3D information is received from the MR terminal 10 (YES in step S215), the processor 21A of the sharing server 20 causes the 3D information sharing unit 215 to store the 3D information as shared information regarding the corresponding room in the shared information storage unit 221 of the data memory 22 (step S216).

The MR terminals 10 can enter the same room and grasp the complete shape of the real space to be shared in the above-described manner. That is to say, as for a real space that has been sensed in the past, the other MR terminals 10 can recognize the shape of this space without sensing the space again. Accordingly, the processor 11A of each MR terminal 10 can cause the display information generation unit 113 to construct a mixed reality space based on 3D information regarding a real space stored in the 3D information storage unit 121 and virtual information stored in the virtual information stored in the virtual information storage unit 123, and present the constructed mixed reality space to the user using the display device 15.

FIG. 8 is a schematic diagram for illustrating processing for sharing 3D information regarding a real space between two MR terminals 10 (first MR terminal 10 #1 and second MR terminal 10 #2). FIG. 9 is a diagram that shows an example of shared information managed by the sharing server 20, which is a shared information management server, when the 3D information regarding the real space is shared between the two MR terminals 10.

For example, it is assumed that the first MR terminal 10 #1, which has finished sensing of the shape of the target real space, attempts to enter a room for which shared information regarding the real space is not yet managed by the sharing server 20. In this case, the processor 11A of the first MR terminal 10 #1 performs the processing in the above steps S101 to S106. Thus, the processor 11A generates anchor information ANC #1 in a mixed reality space CS recognized by this MR terminal 10 #1, and uploads the generated anchor information as first anchor information ANC #1 to the sharing server 20. Thereafter, the processor 11A of the first MR terminal 10 #1 performs the processing in the above steps S113 to S115. Thus, the processor 11A can upload first 3D information 3D #1, which is 3D information regarding the target real space, to the sharing server 20. As a result, an ID (TA #1) of the MR terminal that is in the room, the anchor information (ANC #1), and the 3D information (3D #1) are stored in association with a room ID (RM #1) indicating this room in the shared information storage unit 221 of the sharing server 20, and are managed as shared information in the sharing server 20.

Thereafter, if a new user enters a specific area, such as a target chamber, and starts the second MR terminal 10 #2, the processor 11A of the second MR terminal 10 #2 registers an ID (TA #2) of the second MR terminal 10 #2 to the sharing server 20 by performing the processing in the above steps S101 to S103, and then advances the processing to the above step S107. The processor 11A of the second MR terminal 10 #2 can download the anchor information (ANC #1) regarding the room from the sharing server 20 through the processing in the above steps S107 to S109. Furthermore, the processor 11A of the second MR terminal 10 #2 can download the 3D information (3D #1) regarding the room from the sharing server 20 through the processing in the above steps S110 to S112. The same virtual object VO can be viewed on the second MR terminal 10 #2 in the same mixed reality space CS while aligning the coordinate axes with those of the first MR terminal 10 #1 by using the downloaded anchor information ANC #1 and 3D information 3D #1.

FIG. 10 is a schematic diagram for illustrating processing for sharing 3D information regarding the real space when a third MR terminal also joins, and FIG. 11 is a diagram that shows an example of shared information managed by the shared information management server when 3D information regarding the real space is shared between the three MR terminals.

If, thereafter, another new user enters the target chamber and starts the third MR terminal 10 #3, the processor 11A of the third MR terminal #2 also registers an ID (TA #3) of the third MR terminal 10 #3 to the sharing server 20 and can download the anchor information (ANC #1) and the 3D information (3D #1) regarding the room from the sharing server 20, similarly to the above-described second MR terminal 10 #2. Accordingly, the same virtual object VO can also be viewed on the third MR terminal 10 #3 in the same mixed reality space CS while aligning the coordinate axes with those of the first and second MR terminals 10 #1 and 10 #2 by using the downloaded anchor information ANC #1 and 3D information 3D #1.

As described above, the second and third MR terminals 10 #2 and 10 #3 can recognize the 3D information regarding the target real space, without sensing the real space, while recognizing the same absolute coordinates and coordinate axes as those of the first MR terminal 10 #1, using the anchor information (ANC #1) and the 3D information (3D #1) uploaded by the first MR terminal 10 #1 that has the 3D information regarding the target real space. Accordingly, the second MR terminal 10 #2 and the third MR terminal 10 #3 are enabled to use the mixed reality space in a short time.

In general, it is said that users start to feel slow when the processing time exceeds 1 second, and users find it difficult to keep their attention when the processing time exceeds 10 seconds, (e.g., see "Response Time Limits: Article by Jakob Nielsen" [Online], [Retrieved on Jun. 24, 2019]. According to the present embodiment, if, for example, the sharing server 20 is a laptop PC (memory: 16 GB, CPU: Intel Core i7 2.8 GHz, OS: Windows (registered trademark) 10 64 bit) that is connected to Hololens serving as the first MR terminal 10 #1, through Wi-Fi, and 1.56-MB 3D information (number of points: about 50000) is uploaded from the first MR terminal 10 #1 to the sharing server 20 through HTTP communication, it requires about 1.5 seconds. In addition, if the same 3D information is downloaded from the sharing server 20 to Hololens serving as the second MR terminal 10 #2 through HTTP communication, it requires about 0.5 seconds. From these results, if, for example, it requires one minute to sense an entire chamber, in the present embodiment, it is possible to start sharing a mixed reality space about one minute earlier than when the entire chamber is sensed with conventional MR terminals 10.

In such a situation, the shape of a real space frequently changes; e.g., the positions of a desk, a chair, or the like change, and the position at which a person stands changes. If 3D information regarding the real space uploaded to the sharing server 20 is not updated in accordance with these changes in the shape, 3D information indicating a different shape from the changed shape is transmitted to the MR terminals 10. Consequently, a problem arises in that, when an MR terminal 10 that has downloaded such taste information uses a mixed reality space, virtual information will be displayed without regard to the shape of the real space. That is to say, since the shape of the real space frequently changes due to movement of a person or an object, 3D information regarding the real space needs to be constantly updated to the latest information in order to form a mixed reality space without any sense of discomfort. However, if 3D information regarding the entire real space is updated, processing takes time at all such occasions. For this reason, in the present embodiment, 3D information regarding the real space uploaded to the sharing server 20 is updated as follows.

The processor 11A of the MR terminal 10 causes the 3D information acquisition unit 111 to reacquires the shape of the real space that has been sensed in the direction in which the user is facing by the 3D sensor 16, with a period of T seconds, for example (step S116). Furthermore, the processor 11A causes the 3D information change detection unit 114 to compare the acquired 3D information regarding the real space with the previously acquired 3D information stored in the 3D information storage unit 121 of the data memory 12, and determine whether or not the shape has changed (step S117). For example, the MR terminal 10, such as HoloLens, recognize the shape of the real space as a set of points and surfaces (point cloud data). FIG. 12 is a diagram that shows a box that is a real object RO to be sensed, and 3D information 3DI regarding this box. For example, if the box shown in FIG. 12 is sensed by HoloLens, HoloLens recognizes it as a set of points and surfaces. Accordingly, the processor 11A causes the 3D information change detection unit 114 to check the numbers of points and surfaces included in the 3D information 3DI, compare these numbers with the previously acquired numbers, and determine whether or not the shape has changed based on whether or not the number of points or surfaces has changed from the previously acquired value by a threshold or more. If it is determined that the shape has not changed (NO in step S117), the processor 11A repeats the processing from the above step S116.

On the other hand, if it is determined that the shape has changed (YES in step S117), the processor 11A causes the updated information upload unit 115 to upload, as updated information, information of the changed portion of the 3D information regarding the real space for which it is determined that the shape has changed, to the sharing server 20 (step S118). Thereafter, the processor 11A repeats the processing from the above step S116.

Note that the processor 11A may alternatively store the 3D information regarding the real space acquired at the current time by the 3D information acquisition unit in the 3D information storage unit 121 only when the 3D information change detection unit 114 determines that the shape has changed, rather than constantly. Thus, the processing time of the processor 11A can be shortened, and the waste of memory life due to updating of the memory content of the 3D information storage unit 121 can be reduced.

Meanwhile, the processor 21A of the sharing server 20 causes the updated information management unit 216 to determines whether or not updated information of the current 3D information regarding the real space uploaded from any of the MR terminals 10 that are in the room has been received (step S217). If it is determined that the updated information has not been received (NO in step S217), the processor 21A repeats the processing from the above step S201. On the other hand, if it is determined that the updated information has been received (YES in step S217), the processor 21A causes the updated information management unit 216 to update the corresponding portion of the 3D information regarding the real space stored as the shared information regarding the corresponding room in the shared information storage unit 221 with the received information of the changed portion of the current 3D information regarding the real space (step S218). Thereafter, the processor 21A repeats the processing from the above step S201.

Here, updated information will be described. FIG. 13 is a schematic diagram for illustrating uploading of 3D information regarding a real space. 3D information acquired by an MR terminal 10, which is typified by HoloLens, is divided into a plurality of groups (groups a to g in this example) within the MR terminal 10 as shown in FIG. 13. In the present embodiment, a target mixed reality space CS is managed while being divided into a plurality of partial spaces PS in accordance with those groups, and whether or not the shape has changed is determined for each of the partial spaces. Here, if a chair, which is a real object RO, moves in a direction indicated by an arrow in FIG. 13, the shapes of a partial space PSb and a partial space PSf change. If the MR terminal 10 with a sensing function detects these changes in the spatial shape, pieces 3db and 3Df of the 3D information regarding the partial spaces PSb and PSf and the time of acquisition of these pieces of the 3D information are uploaded as updated information to the sharing server 20. Thus, 3D information managed by the sharing server 20 can be updated every time the shape of the real space changes.

Here, in order for the MR terminal 10 to detect whether or not the 3D information has changed, it is necessary to compare the 3D information acquired before the shape changes with the 3D information acquired after the shape has changed. One method for comparing the 3D information is to search for a combination of points that minimizes the distance between point clouds of the two pieces of 3D information. This is a method in which processing for searching for the closest point to a point ai in a point cloud A out of points B to be compared is performed for all points, and the computational complexity is $O(N^2)$. For this reason, when pieces of the 3D information with a large number of points, such as that of a real space, are compared, the processing time becomes very long. Consequently, if the shape frequently changes, a problem arises in that updating of the 3D information cannot keep up with the changes in the shape.

Figure 14:
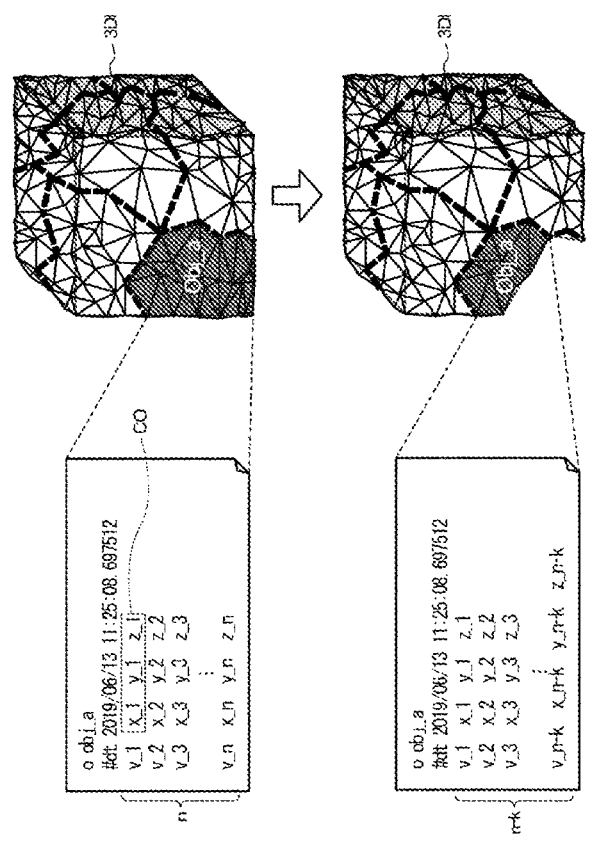
FIG. 14 is a diagram for illustrating an example of 3D information change detection performed by a 3D information change detection unit in FIG. 3.

In the present embodiment, a change in the shape of a real space is detected only by performing lightweight processing to only check an increase and decrease in the numbers of points and surfaces included in the 3D information, rather than comparing points. Specifically, the MR terminal 10 senses the shape of the space at T-seconds intervals, and records the recognized numbers of points and surfaces in the 3D information. If the absolute value of the amount of change is a threshold or more, it is determined that the shape of the real space has changed. Since counting up the points and surfaces in each piece of the 3D information takes a computational complexity of O(N) at most, changes in the 3D information can be rapidly detected. This example will be described with reference to FIG. 14. FIG. 14 is a diagram for illustrating an example of 3D information change detection performed by the 3D information change detection unit in FIG. 3. In FIG. 14, the 3D information 3DI regarding the box that is the real object RO in FIG. 12 is divided into a plurality of groups as indicated by dotted lines in FIG. 14. 3D information in each group includes the time of acquisition thereof and the (x, y, z) coordinates CO of each point. FIG. 14 shows a state where the shape of 3D information in a group Obj_a, which is one of those groups, has changed. With the change in the shape of the 3D information in the group Obj_a, the number of points corresponding to this group also decreases from n to n-k, as shown in FIG. 14. In the present embodiment, if the amount of decrease in points (k in FIG. 14) is a threshold or more, it is determined that the shape has changed in this group, and only the 3D information in the group Obj_a is uploaded as updated information to the sharing server 20.

(Effects)

As described above, in one embodiment, the sharing server 20 manages 3D information and anchor information obtained by an MR terminal 10 that first entered a specific area, such as a target chamber, sensing a real space. When an MR terminal 10 attempts to enter the room, the sharing server 20 transmits the managed 3D information and anchor information to this MR terminal 10. Accordingly, the other MR terminal 10 can acquire the 3D information and the anchor information via the sharing server 20. Accordingly, if the real space has been sensed once, users do not need to sense this space in every corner and can therefore quickly start sharing a mixed reality space. Accordingly, according to one embodiment, the 3D information regarding the target real space can be shared between a plurality of MR terminals without spending a long processing time.

Further, in one embodiment, when an MR terminal 10 senses a real space, the MR terminal 10 calculates a change from the shape of the real space before being sensed, only using the number of points and surfaces included in the 3D information. Accordingly, the MR terminal 10 can rapidly determine whether or not the shape has changed. If it is determined that a change has occurred, the MR terminal 10 only uploads peripheral information to the sharing server 20. Thus, information regarding the real space on the sharing server 20 can be updated in real time with small traffic. That is to say, according to one embodiment, 3D information regarding a target real space can be shared between a plurality of MR terminals while keeping the information updated, without spending a long processing time.

Other Embodiments

Note that this invention is not limited to the above embodiment.

For example, in the above embodiment, updated information is uploaded from any of the MR terminals 10 that are in a room to the sharing server 20, thereby making it possible to download the latest 3D information regarding the real space to an MR terminal 10 that comes in and out from now on. When receiving the upload of the updated information, the sharing server 20 may notify MR terminals 10 other than the MR terminal 10 that has transmitted the updated information that there is an update, such that these MR terminals 10 can also use the updated 3D information. For example, there are cases where, even when the shape of the real object RO has not changed, and even if there is a position on the real object RO that cannot be sensed by a certain MR terminal 10, another MR terminal 10 located at a different position from the aforementioned MR terminal 10 may be capable of sensing the real object RO. If this 3D information is downloaded in advance, the time for newly sensing the real object RO can be omitted when the terminal moves and information about the shape of the real object RO that has not been necessary until now is required.

In the above embodiment, all of the MR terminals 10 have the 3D sensor 16, but MR terminals 10 other than the first MR terminal 10 #1 that first uploads 3D information may alternatively be inexpensive terminals that do not have a 3D sensor. That is to say, since the second and third MR terminals 10 #2 and 10 #3 can recognize 3D information regarding a real space without sensing this space, these MR terminals 10 #2 and 10 #3 can acquire the 3D information regarding the real space even if these MR terminals are terminals that do not have the 3D sensor 16 for sensing the shape of the real space. Accordingly, a mixed reality space can be used and shared without the 3D sensor 16.

In short, this invention is not limited to the above embodiment, and can be embodied by modifying constituent elements without departing from the gist thereof at the implementation stage. Various inventions can be formed by appropriately combining a plurality of constituent elements disclosed in the above embodiment. For example, some of all constituent elements disclosed in the embodiment may be deleted. Furthermore, constituent elements of different embodiments may be combined as appropriate.

REFERENCE SIGNS LIST 10, 10 #1, 10 #2, 10 #n MR terminal
11, 21 Processing unit
11A, 21A Processor
11B, 21B Program memory
12, 22 Data memory
13, 23 Communication interface
14 Input device
15 Display device
16 3D sensor
17, 24 Bus
20 Sharing server
111 3D information acquisition unit
112 Initial setting unit
113 Display information generation unit
114 3D information change detection unit
115 Updated information upload unit
121 3D information storage unit
122 Anchor information storage unit
123 Virtual information storage unit
211 Room management unit
212 Room creation unit
213 Anchor information sharing unit
214 3D information management unit 215 3D information sharing unit
216 Updated information management unit
221 Shared information storage unit
1121 Room check unit
1122 Room creation request unit
1123 Anchor information upload unit
1124 Anchor information download unit
1125 3D information check unit
1126 3D information upload unit
1127 3D information download unit
3D #1, 3DI, 3db, 3Df 3D information
ANC #1 Anchor information
CO (x, y, z) coordinates
CS Mixed reality space
NW Communication network
PS, PSb, PSf Partial space
RO Real object
VO Virtual object

The invention claimed is:

1. A mixed reality space sharing system comprising:
a plurality of mixed reality terminals, each of the plurality of mixed reality terminals creating a mixed reality space in which virtual information is mapped onto 3D information regarding a real space based on the 3D information and anchor information for anchoring between the virtual information and the 3D information to visualize the mixed reality space, a first terminal of the plurality of mixed reality terminals including:
a first 3D sensor for repeatedly sensing a 3D object in the real space and acquiring the 3D information, the 3D information including points and surfaces disposed at the 3D object in the real space, the points disposed at the 3D object including vertexes of the 3D object, each of the surfaces disposed at the 3D object being surrounded by linear lines disposed at the 3D object, the surfaces being generated by connecting between adjacent points of the points by the linear lines; and
a first processor configured to execute a first program stored in a first memory so as to:
generate the anchor information to anchor between the 3D information and the virtual information; and
transmit the 3D information and the anchor information to a shared information management server; and
the shared information management server to which the plurality of mixed reality terminals are connected, the shared information management server including:
a second processor configured to execute a second program stored in a second memory so as to:
create a room by associating the 3D information and the anchor information transmitted from the first terminal with each other;
manage the 3D information; and
transmit the 3D information and the anchor information to a second terminal of the plurality of mixed reality terminals, the second terminal being different from the first terminal,
wherein the second terminal includes:
a third processor configured to execute a third program stored in a third memory so as to:
download the 3D information and the anchor information that are transmitted from the shared information management server, and
create the mixed reality space using the downloaded 3D information and anchor information, the first processor is further configured to:
periodically compare the 3D information acquired by the first 3D sensor at a first time that is a later time than a second time with immediately previously acquired 3D information acquired by the first 3D sensor at the second time with respect to a first number of the points and the surfaces in the 3D information and a second number of the points and the surfaces of the immediately previously acquired 3D information; and
transmit, as first updated information, 3D information of only a portion with a significant change corresponding to a part of the 3D object to the shared information management server when a difference value between the first number and the second number is a first threshold or more, and
the second processor is further configured to update the 3D information with the first updated information transmitted from the first terminal.

2. The mixed reality space sharing system according to claim 1,
wherein the second terminal further includes:
a second 3D sensor for repeatedly sensing the 3D object in the real space and acquiring the 3D information, and
the third processor is further configured to:
periodically compare the 3D information acquired by the second 3D sensor at a third time that is a later time than a fourth time with immediately previously acquired 3D information acquired by the second 3D sensor at the fourth time with respect to a third number of the points and the surfaces in the 3D information acquired by the second 3D sensor and a fourth number of the points and the surfaces of the immediately previously acquired 3D information acquired by the second 3D sensor; and
transmit, as second updated information, 3D information of only a portion with a significant change corresponding to a part of the 3D object to the shared information management server when a difference value between the third number and the fourth number is a second threshold or more, and
the second processor in the shared information management server is further configured to update the 3D information acquired by the second 3D sensor with the second updated information transmitted from the second terminal.

3. A shared information management server comprising:
a memory configured to store a program; and
a processor configured to execute the program so as to:
create a room by associating 3D information regarding a real space and anchor information for anchoring virtual information and the 3D information;
manage the 3D information, the 3D information and the anchor information being used by a plurality of mixed reality terminals, each of the plurality of mixed reality terminals creating a mixed reality space in which the virtual information is mapped onto the 3D information based on the 3D information and the anchor information to visualize the mixed reality space wherein the 3D information is acquired by repeatedly sensing a 3D object in the real space via a first 3D sensor of a first terminal of the plurality of mixed reality terminals and includes points and surfaces disposed at the 3D object in the real space, the points disposed at the 3D object including vertexes of the 3D object, each of the surfaces disposed at the 3D object being surrounded by linear lines disposed at the 3D object, the surfaces being generated by connecting between adjacent points of the points by the linear lines;

transmit the 3D information and the anchor information to a second terminal of the plurality of mixed reality terminals, the second terminal being different from the first terminal;

receive first updated information of only a portion with a significant change of the 3D information corresponding to a part of the 3D object, the first updated information being transmitted from the first terminal when a difference value between a first number of the points and the surfaces of the 3D information acquired by the first 3D sensor at a first time that is a later time than a second time and a second number of the points and the surfaces of immediately previously acquired 3D information acquired by the first 3D sensor at the second time via the first terminal is a first threshold or more; and update the 3D information with the first updated information transmitted from the first terminal.

4. The shared information management server according to claim 3,
wherein the processor is further configured to:
receive second updated information of only a portion with a significant change corresponding to a part of the 3D object of the 3D information acquired by repeatedly sensing the 3D object in the real space via a second 3D sensor of the second terminal, the second updated information being transmitted from the second terminal when a difference value between a third number of the points and the surfaces of the 3D information acquired by the second 3D sensor at a third time that is a later time than a fourth time and a fourth number of the points and the surfaces of immediately previously acquired 3D information acquired by the second 3D sensor at the fourth time via the second terminal is a second threshold or more; and update the 3D information acquired by the second 3D sensor with the second updated information transmitted from the second terminal.

5. A mixed reality space sharing method to be used in a mixed reality space sharing system including: a plurality of mixed reality terminals, each of the plurality of mixed reality terminals creating a mixed reality space in which virtual information is mapped onto 3D information regarding a real space based on the 3D information and anchor information for anchoring between the virtual information and the 3D information to visualize the mixed reality space; and a shared information management server to which the plurality of mixed reality terminals are connected, the mixed reality space sharing method for causing a processor to execute a program stored in a memory, the mixed reality space sharing method comprising executing on the processor the steps of:

repeatedly acquiring the 3D information by sensing a 3D object in the real space via a first 3D sensor of a first terminal of the plurality of mixed reality terminals, the 3D information including points and surfaces disposed at the 3D object in the real space, the points disposed at the 3D object including vertexes of the 3D object, each of the surfaces disposed at the 3D object being surrounded by linear lines disposed at the 3D object, the surfaces being generated by connecting between adjacent points of the points by the linear lines;

generating the anchor information to anchor between the 3D information and the virtual information;

uploading the 3D information and the anchor information to the shared information management server;

creating a room by associating the 3D information and the anchor information uploaded from the first terminal with each other, and managing 3D information, in the shared information management server;

transmitting the 3D information and the anchor information from the shared information management server to a second terminal of the plurality of mixed reality terminals, the second terminal being different from the first terminal, in accordance with a request from the second terminal;

downloading the 3D information and the anchor information that are transmitted from the shared information management server, and creating the mixed reality space using the downloaded 3D information and anchor information, in the second terminal;

periodically comparing the 3D information acquired by the first 3D sensor at a first time that is a later time than a second time with immediately previously acquired 3D information acquired by the first 3D sensor at the second time with respect to a first number of the points and the surfaces in the 3D information and a second number of the points and the surfaces of the immediately previously acquired 3D information via the first terminal;

transmitting, as first updated information, 3D information of only a portion with a significant change corresponding to a part of the 3D object from the first terminal to the shared information management server when a difference value between the first number and the second number is a first threshold or more; and updating the 3D information with the first updated information transmitted from the first terminal via the shared information management server.

6. The mixed reality space sharing method according to claim 5, further comprising:

acquiring the 3D information by repeatedly sensing the 3D object in the real space via a second 3D sensor of the second terminal;

periodically comparing the 3D information acquired by the second 3D sensor at a third time that is a later time than a fourth time with immediately previously acquired 3D information acquired by the second 3D sensor at the fourth time with respect to a third number of the points and the surfaces in the 3D information acquired by the second 3D sensor and a fourth number of the points and the surfaces of the immediately previously acquired 3D information acquired by the second 3D sensor via the second terminal;

transmitting, as second updated information, 3D information of only a portion with a significant change corresponding to a part of the 3D object from the second terminal to the shared information management server when a difference value between the third number and the fourth number is a second threshold or more; and updating the 3D information acquired by the second 3D sensor with the second updated information transmitted from the second terminal via the shared information management server.

* * * * *